J. Davis,
Horse Power.
Nº 50,803.      Patented Nov. 7, 1865.
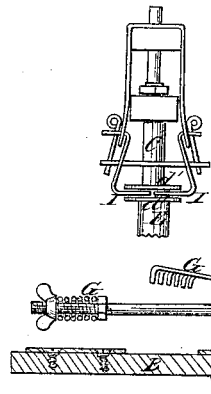
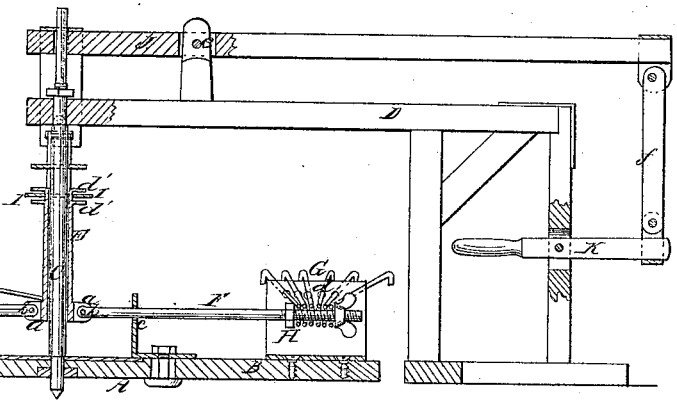
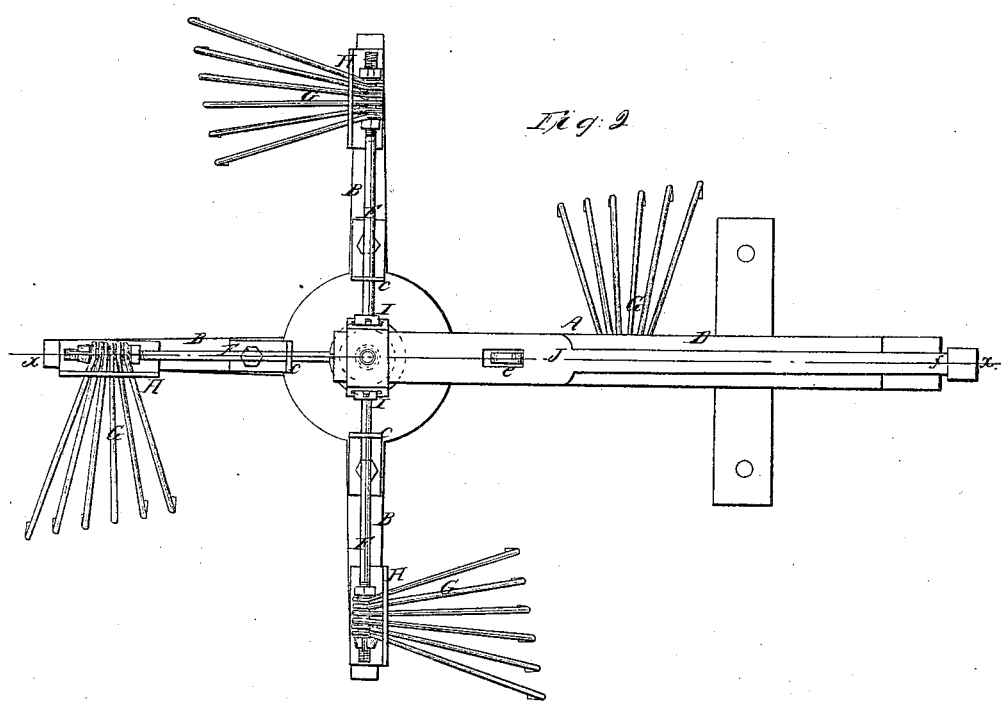

UNITED STATES PATENT OFFICE.

JOHN DAVIS, OF NORTHAMPTON, ILLINOIS.

IMPROVEMENT IN DEVICES FOR SPURRING OR DRIVING HORSES.

Specification forming part of Letters Patent No. 50,803, dated November 7, 1865.

*To all whom it may concern:*

Be it known that I, JOHN DAVIS, of Northampton, in the county of Peoria and State of Illinois, have invented a new and Improved Device for Spurring or Driving Horses; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\,x$, Fig. 2; Fig. 2, a plan or top view of the same; Fig. 3, an enlarged section of a part pertaining to the same.

Similar letters of reference indicate corresponding parts.

The object of this invention is to obtain a simple device by which horses may be spurred in a sweep horse-power without the aid of a driver, and a plurality of horses, when used, spurred simultaneously—that is to say, those which require it, the spurs only acting upon those which do not perform their share of the work.

A represents a horse-power, provided with sweeps B, to which the horses are attached.

C is the shaft, to which the sweeps are secured and from which the power is taken, the shaft being supported by a suitable frame, D. Any number of sweeps B may be used, according to the number of horses required. Four sweeps are shown in Fig. 2.

On the shaft C there is placed a sleeve, E, the lower end of which is provided with lugs $a$, between which rods F are secured by pivots $b$, so that they may rise and fall freely, or be moved up and down on the pivots $b$ as centers. There is a rod, F, over each sweep B, and said rods pass loosely through upright plates or bearings $c$ on the sweeps.

On the outer parts of the rods F there are fitted a series of rods, G, which pass loosely through holes $d$ in upright plates H, secured to the ends of the sweeps, the rods G being curved or bent down at their ends and made sufficiently sharp to serve as spurs.

On the upper end of the sleeve E there are two flanges, $d'\,d'$, between which the lower ends of two jaws, I I, are fitted, the upper ends of the jaws being connected to a lever, J, having its fulcrum $e$ on the frame D. The outer end of the lever J is connected by a link, $f$, to a lever, K, which may be arranged or placed within convenient reach of the operator or attendant of the machine which is driven by the horse-power.

From the above description it will be seen that by actuating the lever K the sleeve E on the shaft C will be raised and lowered, and the rods F also raised and lowered, and consequently the rods G and the outer ends of the latter made to act as spurs. These rods G are designed to be of such a length that they will only act upon the horses which are indolent or lag, the working animals in pulling and doing their share of the work being beyond the reach of the spurs. Consequently the rods G may be depressed or forced down at any time without coming in contact with any horse which does not require to be spurred.

The whole arrangement is extremely simple and efficient, and may be applied at a very moderate cost.

Having thus described my invention, I claim as new and desire to secure by Letters Patent—

The attachment to a sweep horse-power of a series of rods provided with spurs and arranged with suitable levers, and in such relation with the sweeps that all of the horses attached to the power, or such as require it, may, by a single manipulation of a lever, be spurred simultaneously, substantially as described.

JOHN DAVIS.

Witnesses:
CHARLES WILMOT,
ELIJAH STOWEL.